US009269062B2

(12) United States Patent
Dhillon et al.

(10) Patent No.: US 9,269,062 B2
(45) Date of Patent: Feb. 23, 2016

(54) METHODS FOR OPTIMIZING ENERGY CONSUMPTION AND DEVICES THEREOF

(71) Applicant: Wipro Limited, Bangalore (IN)

(72) Inventors: Har Amrit Pal Singh Dhillon, Amritsar (IN); Parminder Singh, Gurgaon (IN); Dinesh Kumar Pathak, Ghaziabad (IN)

(73) Assignee: Wipro Limited, Bangalore (IN)

( * ) Notice: Subject to any disclaimer, the term of this patent is extended or adjusted under 35 U.S.C. 154(b) by 414 days.

(21) Appl. No.: 13/855,757

(22) Filed: Apr. 3, 2013

(65) Prior Publication Data

US 2014/0229027 A1    Aug. 14, 2014

(30) Foreign Application Priority Data

Feb. 12, 2013    (IN) .............................. 589/CHE/2013

(51) Int. Cl.
*G06Q 50/06*    (2012.01)
*G06Q 10/06*    (2012.01)

(52) U.S. Cl.
CPC .............. *G06Q 10/063* (2013.01); *G06Q 50/06* (2013.01); *Y04S 20/40* (2013.01); *Y04S 50/14* (2013.01)

(58) Field of Classification Search
None
See application file for complete search history.

(56) References Cited

U.S. PATENT DOCUMENTS

| | | | |
|---|---|---|---|
| 4,360,881 A | 11/1982 | Martinson | |
| 6,349,883 B1 | 2/2002 | Simmons et al. | |
| 6,633,823 B2 | 10/2003 | Bartone et al. | |
| 8,095,233 B1 | 1/2012 | Shankar et al. | |
| 2008/0243687 A1* | 10/2008 | Johnson et al. | 705/40 |
| 2010/0262313 A1* | 10/2010 | Chambers et al. | 700/295 |
| 2011/0106327 A1* | 5/2011 | Zhou et al. | 700/291 |
| 2011/0106328 A1* | 5/2011 | Zhou et al. | 700/291 |
| 2012/0166616 A1* | 6/2012 | Meehan et al. | 709/224 |
| 2012/0310416 A1* | 12/2012 | Tepper et al. | 700/276 |
| 2012/0323390 A1* | 12/2012 | Kobayasi | H02J 3/14 700/295 |

* cited by examiner

*Primary Examiner* — Sean Shechtman
(74) *Attorney, Agent, or Firm* — LeClairRyan, a Professional Corporation

(57) ABSTRACT

A method, non-transitory computer readable medium, and energy optimization device that optimizes energy consumption includes generating an energy model for each of a plurality of sites in an enterprise network. A plurality of service windows is determined for each of the sites. An energy consumption forecast is generated for each of the sites based on the generated energy models and the determined service windows. Current energy consumption information is obtained for one of the sites. Optimization recommendation(s) are determined for the one site based on a deviation of the obtained current energy consumption information for the one site from the generated energy consumption forecast for the one site in an active one of the determined service windows for the one site, and the optimization recommendation(s) are output.

24 Claims, 4 Drawing Sheets

METHODS FOR OPTIMIZING ENERGY CONSUMPTION AND DEVICES THEREOF

This application claims the benefit of Indian Patent Application Filing No. 589/CHE/2013, filed Feb. 12, 2013, which is hereby incorporated by reference in its entirety.

FIELD

This technology generally relates to methods and devices for optimizing energy consumption and, more particularly, to methods, non-transitory computer readable medium, and devices for managing energy utilization across a plurality of geographically separated sites in a network of a service window based enterprise.

BACKGROUND

Escalating energy costs and increased awareness of environmental impact of energy consumption are some of the reasons enterprises are increasingly attempting to manage and optimize energy utilization. However, energy planning, particularly for enterprises with a network of geographically separate sites, such as restaurants, retail stores, and banks, is not currently effective. Enterprises are often unable to plan energy consumption at a site level due to ineffective energy consumption monitoring processes and inability to obtain granular or temporal consumption data. Site level managers are often not effective at managing energy consumption or, if they do have such expertise, can be costly. Additionally energy consumption profiles of network sites tend to vary. Accordingly, enterprises are unable to automatically and dynamically assess consumption and generate actionable intelligence for optimizing consumption.

Significantly, energy planning is also not effective due to the lack of correlation of business intensity with energy utilization. Business intensity can be analyzed based on service windows or time windows in a business day, or other time period, during which business intensity varies from other time windows in the business day. Absent such granular, service window based energy consumption data, enterprises are unable to effectively manage and optimize energy consumption across a network of sites.

SUMMARY

A method for optimizing energy consumption includes generating, with an energy optimization device, an energy model for each of a plurality of sites in an enterprise network. A plurality of service windows is determined, with the energy optimization device, for each of the sites. An energy consumption forecast is generated, with the energy optimization device, for each of the sites based on the generated energy models and the determined service windows. Current energy consumption information is obtained, with the energy optimization device, for one of the sites. One or more optimization recommendations are determined, with the energy optimization device, for the one site based on a deviation of the obtained current energy consumption information for the one site from the generated energy consumption forecast for the one site in an active one of the determined service windows for the one site. The one or more optimization recommendations are output with the energy optimization device.

A non-transitory computer readable medium having stored thereon instructions for optimizing energy consumption comprising machine executable code which when executed by a processor, causes the processor to perform steps including generating an energy model for each of a plurality of sites in an enterprise network. A plurality of service windows is determined for each of the sites. An energy consumption forecast is generated for each of the sites based on the generated energy models and the determined service windows. Current energy consumption information is obtained for one of the sites. One or more optimization recommendations are determined for the one site based on a deviation of the obtained current energy consumption information for the one site from the generated energy consumption forecast for the one site in an active one of the determined service windows for the one site, and the one or more optimization recommendations are output.

An energy optimization device includes a memory and a processor coupled to the memory and configured to execute programmed instructions stored in the memory, including generating an energy model for each of a plurality of sites in an enterprise network. A plurality of service windows is determined for each of the sites. An energy consumption forecast is generated for each of the sites based on the generated energy models and the determined service windows. Current energy consumption information is obtained for one of the sites. One or more optimization recommendations are determined for the one site based on a deviation of the obtained current energy consumption information for the one site from the generated energy consumption forecast for the one site in an active one of the determined service windows for the one site, and the one or more optimization recommendations are output.

This technology provides a number of advantages including methods, non-transitory computer readable medium, and devices that effectively optimize energy consumption for sites of an enterprise network. With this technology, energy consumption information for various sites in an enterprise network can be correlated and aligned with service windows, identified based on business intensity, so that effect optimizations can be recommended to reduce energy consumption and associated costs.

DETAILED DESCRIPTION

Figure 1:
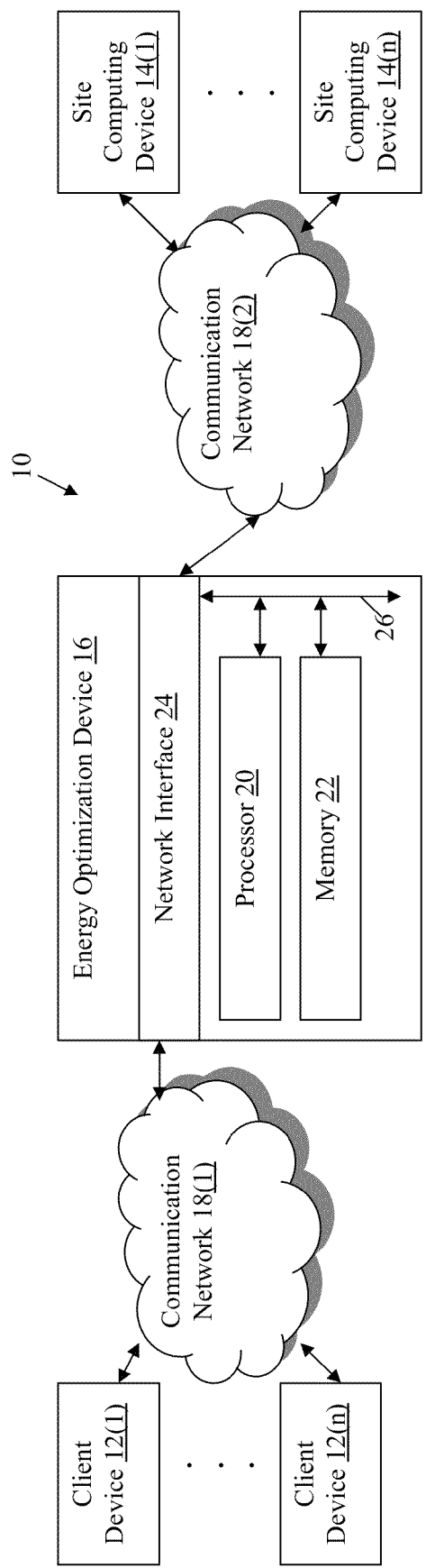
FIG. 1 is a block diagram of an environment with an exemplary energy optimization device.

An exemplary environment 10 with client devices 12(1)-12(n), site computing devices 14(1)-14(n), and an energy optimization device 16, coupled to communication networks 18(1)-18(2) is illustrated in FIG. 1. Other numbers and types of systems, devices, and/or elements in other configurations and environments with other communication network topologies can also be used. This technology provides a number of advantages including methods, non-transitory computer readable medium, and devices that facilitate optimization of energy consumption at a plurality of sites in an enterprise network.

Referring more specifically to FIG. 1, the client devices 12(1)-12(n) enable a user to request and receive information from at least the energy optimization device 16 via the communication network 18(1), although one or more of the client devices 12(1)-12(n) could also communicate with one or more of the site computing devices 14(1)-14(2) using communications networks 18(1)-18(2). In some examples, the client devices 12(1)-12(n) comprise computing devices configured to communicate with the energy optimization device to obtain content, such as one or more web pages or dashboard interfaces, stored at the energy optimization device 16 and/or to send information to the energy optimization device 16.

In some examples, the client devices 12(1)-12(n) include at least one processor, a memory, a user input device, a display, and a network interface, which are coupled together by a bus or other link, although one or more of client devices 12(1)-12(n) can include other numbers and types of components, parts, devices, systems, and elements in other configurations. The processor in each of the client devices 12(1)-12(n) can execute a program of instructions stored in the memory of each of the client devices 12(1)-12(n) for one or more aspects of the present invention as described and illustrated herein, although the processors could execute other numbers and types of programmed instructions.

The memory in each of the client devices 12(1)-12(n) stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory in the client devices 12(1)-12(n).

The user input device in each of the client devices 12(1)-12(n) can be used to input selections, such as a request for content or information from the energy consumption device 16, although the user input devices could be used to input other types of requests and data. The user input devices can include keypads or touch screens although other types and numbers of user input devices can be used. The display in each of the client devices 12(1)-12(n) can be used to show data and information to the user, such as a dashboard interface, in response to a request for the information from the energy optimization device 16. The network interface in each of the client devices 12(1)-12(n) can be used to operatively couple and communicate between the client devices 12(1)-12(n) and at least the energy optimization device 16 via the communication network 18(1).

The site computing devices 14(1)-14(n) are each located at one site in an enterprise network and are each configured to provide business, energy consumption, and other information associated with a respective site to the energy optimization device 16 via communication network 18(2). In one example, the site computing devices 14(1)-14(n) can each be a server computing device located at a respective site of an enterprise network and configured to communicate with other computing systems at the site to obtain information output by the computing systems via one or more networks (not shown), such as local area networks (LANs), present at each site.

In this example, the site computing devices 14(1)-14(n) each include at least one processor, a memory, and a network interface configured to communicate the information obtained from the computing systems to the energy optimization device 16 via communication network 18(2), although each of the site computing devices 14(1)-14(n) could have other numbers and types of components, parts, devices, systems, and elements in other configurations and locations. The processor in each of the site computing devices 14(1)-14(n) executes a program of instructions stored in the memory of each of the site computing devices 14(1)-14(n) for one or more aspects of the present invention as described and illustrated by way of the embodiments herein, although the processors could execute other numbers and types of programmed instructions.

The memory in each of the site computing devices 14(1)-14(n) stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory in the site computing devices 14(1)-14(n). The network interface in each of the site computing devices 14(1)-14(n) can be used to operatively couple and communicate between the site computing devices 14(1)-14(n) and at least the energy optimization device 16 via the communication network 18(2).

In other examples, the site computing devices 14(1)-14(n) each represent a plurality of computing systems which each include at least one processor, a memory, and a network interface configured to communicate separately, and without an intermediary server computing device, with the energy optimization device 16 via communication network 18(2).

Exemplary computing systems at each site can include point of sale (POS) systems or enterprise resource planning (ERP) systems configured to store and provide guest counts, sales transaction information, and/or site information such as orientation, size, construction material, and/or type. In some examples, the computing systems further include customer relationship management (CRM) systems and systems configured to retrieve weather information such as from a third party server computing device connected to communication network 18(2). In other examples, the computing systems include asset management systems configured to store and provide information regarding site equipment including make, model, rating, specifications, and number of assets, performance, and/or operational or temperature data. In yet other examples, the computing systems include human resources systems configured to store and provide employee information including attendance, hours, and number of employees, and/or vehicle tracking and/or site security systems configured to provide information regarding vehicle movement at a site. Each of the site computing devices 14(1)-14(n) can also be configured to communicate with, and/or can also include, other computing systems configured to obtain and/or store other information and provide the information to the energy optimization device 16 via communication network 18(2).

The energy optimization device 16 includes at least one processor 20, a memory 22, and a network interface 24, which are coupled together by a bus 26 or other link, although other numbers and types of components, parts, devices, systems, and elements in other configurations and locations can be used. The network interface 24 in the energy optimization device 16 is used to operatively couple and communicate between the energy optimization device 16, the client devices 12(1)-12(n) and the site computing devices 14(1)-14(n) via the communication networks 18(1)-18(2), although other types and numbers of communication networks 18(1)-18(2) with other types and numbers of connections and configurations can be used. Additionally, one or more of the communication networks 18(1)-18(2) can include one or more local area networks (LANs) and/or wide area networks (WANs). By way of example only, the communication networks can use TCP/IP over Ethernet and industry-standard protocols, including hypertext transfer protocol (HTTP) and/or secure HTTP (HTTPS), for example, although other types and numbers of communication networks can also be used.

The processor 20 in the energy optimization device 16 executes a program of stored instructions for one or more aspects of the present invention as described and illustrated by way of the embodiments herein, although the processor 20 could execute other numbers and types of programmed instructions. The memory 22 in the energy optimization device 16 stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor 20, can be used for the memory 22 in the energy optimization device 16.

Figure 2:
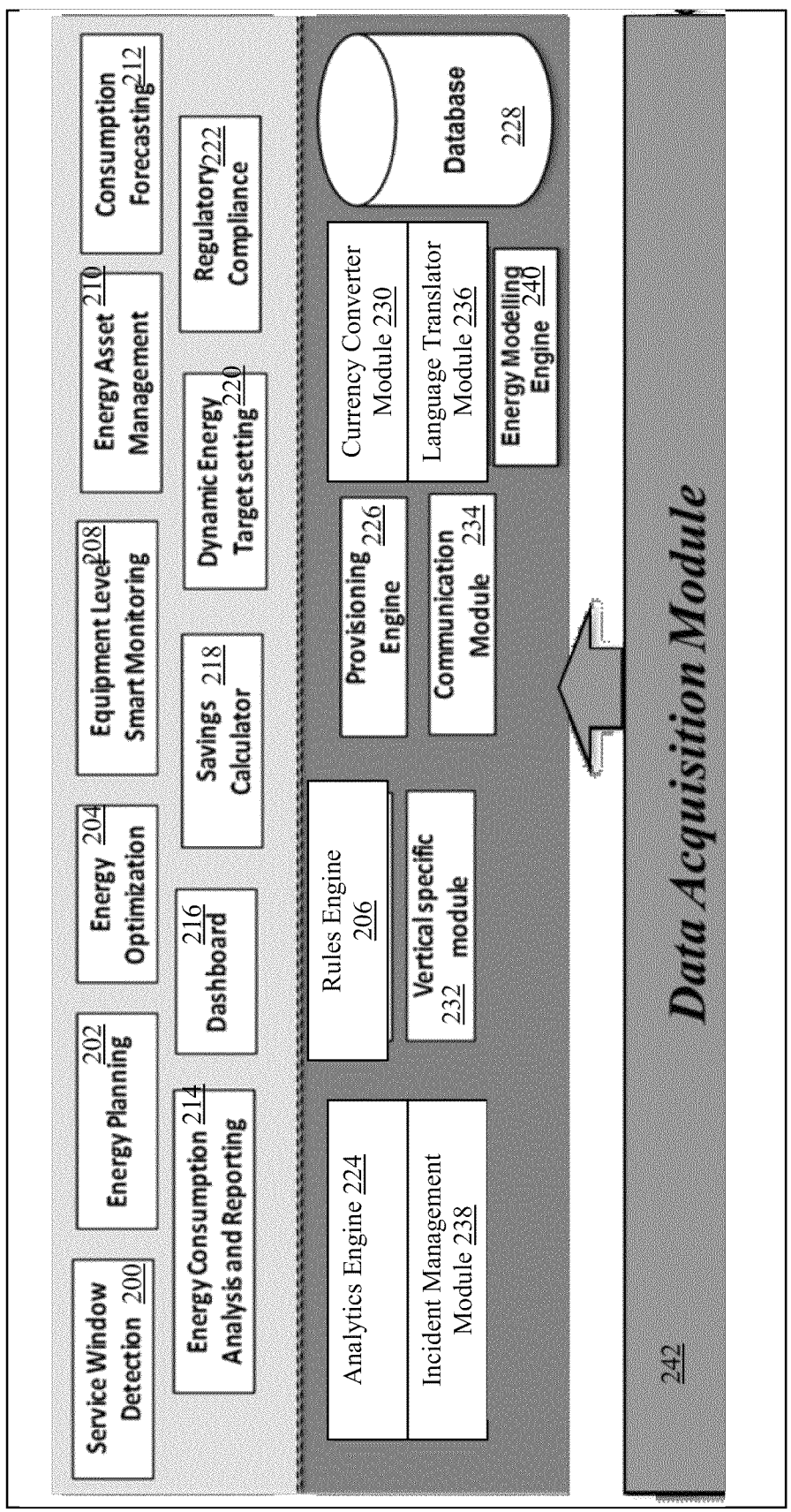
FIG. 2 is a block diagram of an exemplary memory of the exemplary energy optimization device.

Referring to FIGS. 1-2, in this example, the programmed instructions are stored in the memory 22 in one or more modules, examples of which are shown in FIG. 2, although the programmed instructions can also be stored elsewhere and the memory 22 can also include other modules. In this example, the memory 26 includes a service window detection module 200 configured to identify and store an indication of various service windows for each site of an enterprise network as well as identify an active one of the service windows for one or more of the sites), although this module can have other types and numbers of functions and these instructions can be executed in other manners. More specifically, the service window detection module 200 can correlate information, such as business volume (e.g. guest count, sales, and/or transaction volume), employee attendance, and/or weather data retrieved from one of the site computing devices 14(1)-14(n) with a time period in order to identify the various service windows for a site.

In this example, the memory 22 also includes an energy planning module 202 configured to dynamically calculate and forecast energy consumption for a site for a specified time period), although this module can have other types and numbers of functions and these instructions can be executed in other manners. The energy planning module 202 is further configured to dynamically calculate and forecast energy consumption for a site based on information regarding real-time operations of the site. The real-time operations can include sales, weather conditions, occupancy, an active one of the service windows, site equipment performance, employee attendance, vehicle tracking information, guest count, sales transaction information, equipment operational data, and/or weather data, for example, as retrieved from one of the site computing devices 14(1)-14(n). The energy planning module 202 is further configured to consolidate site energy planning data to assist enterprise managers to plan and forecast energy consumption for a representative one of the sites, a subset of the sites, or the entire network of sites, for example.

The memory 22 also can include an energy optimization module 204 configured to dynamically calculate target energy consumption for one or more service windows based on information regarding real-time operations of a site such as sales information, weather information, occupancy, day type, store type, and/or asset age, efficiency, rating, state, event, cooking modes, and/or product mix, for example, as retrieved from one of the site computing devices 14(1)-14(n), although this module can have other types and numbers of functions and these instructions can be executed in other manners. The energy optimization module 204 is further configured to compare the target energy consumption to actual energy consumption for a site and perform a gap analysis to determine the root cause for any deviation based on various rules embedded in a rules engine 206 of the memory 22. Based on this analysis, the energy optimization module 204 is further configured to generate and provide intelligent, practical recommendations to address any deviation.

In this example, the memory 22 further includes an energy level smart monitoring module 208 configured to obtain information regarding assets such as operating conditions or states, events, cook cycles, or modes, for example, from smart or network-connected computing systems located at a site), although this module can have other types and numbers of functions and these instructions can be executed in other manners. The energy level smart monitoring module 208 is further configured to correlate various states of the assets of a site with energy consumption and real-time operations of a site to verify if an asset is operating as expected. The energy asset management module 210 of the memory 22 is configured to leverage data obtained from one or more computing systems located at a site to generate specific intelligence and/or recommendations for managing an asset), although this module can have other types and numbers of functions and these instructions can be executed in other manners.

The consumption forecasting module 212 of the memory 22 is configured to assist enterprise representatives in analyzing consumption forecasts based on historical utility data and other information such as weather data, site size, guest counts, sales transaction, product mix, and/or age of equipment, for example), although this module can have other types and numbers of functions and these instructions can be executed in other manners. The energy consumption analysis and reporting module 214 of the memory 22 is configured to provide various reports and intuitive dashboard interfaces to enterprise representatives. The dashboard interfaces can be managed and/or stored by the dashboard module 216), although this module can have other types and numbers of functions and these instructions can be executed in other manners.

In this example, the memory 22 also includes a savings calculator module 218 configured to calculate savings associated with optimization recommendations dynamically based on actual operating conditions of a site), although this module can have other types and numbers of functions and these instructions can be executed in other manners. The dynamic energy target setting module 220 is configured to dynamically calculate energy targets for site equipment as well as for an entire site based on actual operating conditions of the site and associated assets), although this module can have other types and numbers of functions and these instructions can be executed in other manners. The regulatory compliance module 222 is configured to consolidate information required for various statutory and/or regulatory purposes for example with respect to carbon offsets, food safety, and/or employee health and safety), although this module can have other types and numbers of functions and these instructions can be executed in other manners. The regulatory compliance module 222 is further configured to facilitate reporting and tracking of compliance against statutory and/or regulatory requirements.

The analytics engine 224 of the memory 22 facilitates use of energy data visualization and statistical analysis tools that allow an enterprise to analyze energy consumption data with respect to patterns and trends at a micro level), although this module can have other types and numbers of functions and these instructions can be executed in other manners. The rules engine 206 of the memory 22 is configured to store a set of rules such as rules for consumption deviation, policy mismatch, sequencing, schedule mismatch, and/or operational control. The rules, when implemented, are configured to analyze real time business, operational, and energy usage data (e.g. from one or more meters at a site) based on identified service windows for a site to provide intelligent practical recommendations to bridge the gap between actual and target energy consumption.

In this example, the memory 22 further includes a provisioning engine 226 configured to apply one or more of a set of templates to facilitate provisioning of data for each site into the database 228. The currency converter module 230 of the memory 22 facilitates conversion of currency, such as currency amounts associated with calculated savings. The vertical specific module 232 of the memory 22 is configured to interface with any vertical specific equipment present at a site, such as kitchen equipment in a quick service restaurant, for example, in order to obtain information regarding the equipment.

The communication module 234 of the memory 22 obtains data from one of the site computing devices 14(1)-14(n) and/or computing systems present at a site, such as device management systems, human resources systems, vehicle tracking systems, systems configured to obtain weather data, and/or enterprise resource planning (ERP) systems, for example. The language translator module 236 of the memory 22 is configured to translate output (e.g. optimization recommendations and/or dashboard interfaces) of the energy optimization device 16 into a plurality of languages. The incident management module 238 of the memory 22 is configured to manage alarms, alerts, and/or errors regarding site equipment and forwarding the alarms, alerts, and/or errors in order to inform an end user of one of the client computing devices 12(1)-12(n).

In this example, the memory 22 also includes an energy modeling engine 240 configured to identify sites in an enterprise network that have a similar energy consumption profile and classify those sites as a subset, cluster, or group. Accordingly, the energy modeling engine 240 can obtain and utilize guest counts, sales turnover, weather data, and/or type of retail outlet (e.g. layout, size, orientation), for example, to generate one or more energy models for one or more sites of an enterprise network. Additionally, in this example, the memory 22 of the energy optimization device 16 includes a data acquisition module 242 which is configured to communicate with the site computing devices 14(1)-14(n), using the network interface 24 and via communication network 18(2), to obtain information associated with each site.

Exemplary information obtained by the data acquisition module 242 can include a type of retail outlet and other business information obtained from a CRM computing system and weather data obtained from a computing system configured to communicate via communication network 18(2) with a server computing device storing weather information, which is used to determine an energy model for the site. Other information obtained by the data acquisition module 242 can include employee duty hours, obtained from a human resources computing system, vehicle tracking data, obtained from a vehicle management computing system, and guest counts and sales transaction data, obtained from an ERP computing system, which is used determine an active service window for a site. The data acquisition module 242 can also obtain equipment data including performance and operational data, obtained from a device management computing system, which is used for energy consumption planning and optimization.

Data obtained by the data acquisition module 242 from the site computing devices 14(1)-14(n), and generated by the energy optimization device 16, can be stored in the database 228. Accordingly, the database 228 can store a plurality of tables or mappings of information. Exemplary tables include independent data tables including market, manufacturer, device model, device type, device sub type, measurement, currency, and language tables and dependent data tables including store, device, resource type, device association, device model resource mapping, and/or device configuration tables.

Other tables can include operational or meter data tables or functional data tables including optimization recommendation, service window, service window to site mapping, service window device suggestion mapping, energy model, energy model to store mapping, device rating, fire up, fire up schedule, fire up to device mapping, and/or resource cost tables. Additionally, the database 228 can store output data tables including aggregation data based on service window, day, week, month, and/or year, real time energy consumption data, real time asset operational data, alerts data, benchmark data, asset ratings and specifications, functional data, energy models, fire up and down schedules, optimization recommendation inventory, asset site and/or cluster comparison, asset and site operational data, historical energy consumption data, and/or provisioning data tables.

Optionally, access to information stored by the database 228 is limited by the energy optimization device 16 to credentialed users of the client devices 12(1)-12(n). Additionally, the database 228 can be protected from the Internet or other WAN by being accessible only by communication network 18(1), which in this example, is an enterprise LAN.

Although embodiments of the energy optimization device 16, the client devices 12(1)-12(n), and the site computing devices 14(1)-14(n), are described and illustrated herein, each of the energy optimization device 16, the client devices 12(1)-12(n), and the site computing devices 14(1)-14(n) can be implemented on any suitable computer apparatus or computing device. It is to be understood that the apparatuses and devices of the embodiments described herein are for exemplary purposes, as many variations of the specific hardware and software used to implement the embodiments are possible, as will be appreciated by those skilled in the relevant art(s).

Furthermore, each of the devices of the embodiments may be conveniently implemented using one or more general purpose computers, microprocessors, digital signal processors, and micro-controllers, programmed according to the teachings of the embodiments, as described and illustrated herein, and as will be appreciated by those ordinary skill in the art. The embodiments may also be embodied as one or more non-transitory computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

Figure 3:
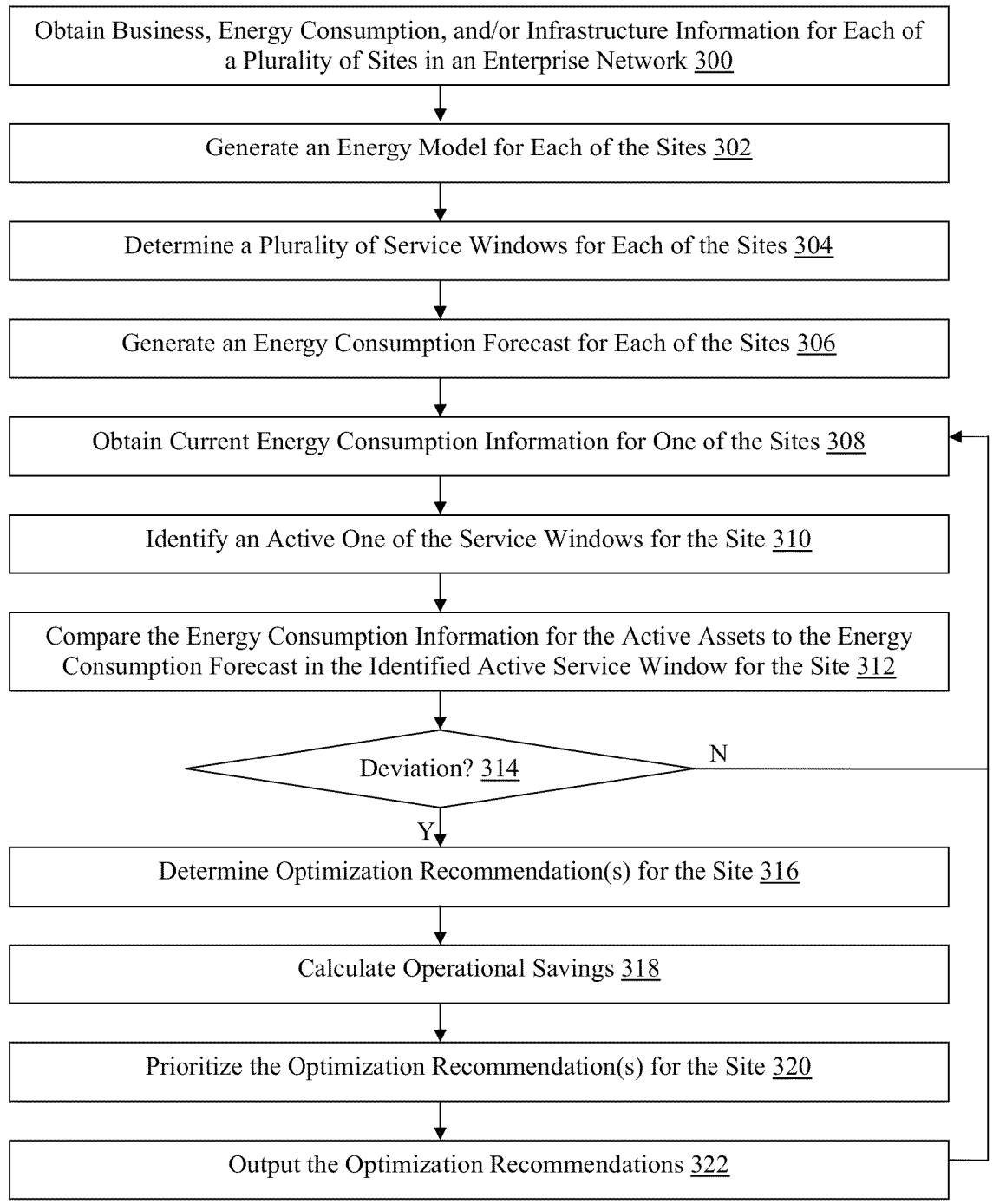
FIG. 3 is a flow chart of an exemplary method for optimizing energy consumption.

An exemplary method for optimizing energy consumption will now be described with reference to FIGS. 1-3. In this example, in step 300 the energy optimization device 16 obtains business, energy consumption, and/or infrastructure information for each site in an enterprise network and stores the obtained information in the database 228. The information can be obtained from the site computing devices 14(1)-14(n), each located at one of the sites, using the network interface 24 and communication network 18(2). The business information can include service type, size, layout, orientation, time of operation, geographic location, historical sales data, variations in business operations, sales turnover, seasonality, and/or weather data, for example, although other business information can also be obtained by the energy optimization device 16 in step 300.

In this example, the energy consumption information obtained by the energy optimization device 16 can include historical energy consumption data, asset information including make, model, specification, functional profile, age, technology, type of consumption, or energy source information including schedule, availability, and/or cost, for example, although other energy consumption information can also be obtained by the energy optimization device 16 in step 300. Additionally, the infrastructure information obtained by the energy optimization device 16 can include energy policies and/or practices (e.g. fire-up schedules for assets), for example, although other infrastructure information can also be obtained by the energy optimization device 16 in step 300.

In step 302, the energy optimization device 16 generates an energy model based on a business, energy consumption, and/or infrastructure model in order to model the target infrastructure for each site. The business, energy consumption, and infrastructure models can be generated by the energy optimization device 16 based on an aggregation of at least some of the obtained business, energy consumption, and infrastructure information, respectively, obtained in step 300.

Optionally, the energy optimization device 16 can identify subset(s) of the sites that have similar energy models. The energy optimization device 16 can store a unique identifier of each site as associated with one of the energy models in the database 228 in order to maintain a mapping of the subset of sites to the one energy model. The mapping of multiple sites to one energy model can allow for the energy optimization device 16 to generate energy consumption forecasts, as well as optimization recommendations, applicable to a subset of sites, as described and illustrated below, thereby reducing the complexity of managing a large network of sites.

In step 304, the energy optimization device 16 determines a plurality of service windows for each of the sites. In order to identify the service windows for a site, the energy optimization device 16 identifies a plurality of time windows during which the business information and/or energy consumption information for the site deviates by an established threshold from the business information and/or energy consumption information for the site during other time windows. Exemplary service windows can include crew setup between 4 AM and 6 AM, breakfast between 6 AM and 8 AM, lunch between 12 PM and 2 PM, and dinner between 6 PM and 8 PM. During each of these service windows, the business intensity (e.g. sales turnover and/or guest counts) or energy consumption may be greater by a threshold than a time window preceding and/or following these service windows. The energy optimization device 16 can store a mapping of the determined service windows to a unique identifier for each site in the database 228.

Optionally, the energy optimization device 16 can also store in the database 228 mapping(s) for the sites based on the energy models generated in step 302. Exemplary mappings include energy model to service window, energy model to fire up schedule, energy model to resource, and energy model to device and fire-up schedule mappings. Additionally, the energy optimization device 16 can store, in the database 228, an energy model to optimization recommendation mapping. Optimization recommendations can be generated as described and illustrated below. Other mappings can also be stored by the energy optimization device 16 in the database 228.

In step 306, the energy optimization device 16 generates an energy consumption forecast for each of the plurality of sites based on the energy models generated in step 302 and the service windows determined in step 304. In some examples, the consumption forecast for each of the sites is generated based on the historical business and historical energy consumption information included in the energy models for each of the sites.

Optionally, energy consumption forecasts are generated by the energy optimization device 16 that are applicable to subsets of sites associated with a same one of the energy models in the database 228, as well to individual sites. Other energy consumption forecasts based on any other shared or similar attributes of the sites can also be generated. The generated energy consumption forecasts can be stored by the energy optimization device 16 in the database 228 as mapped to the determined service windows for each site. Optionally, the energy consumption forecasts can include an indication of each asset active during each service window for each site, and/or each subset of sites, and a target energy consumption value for each asset.

In step 308, the energy optimization device 16 obtains current energy consumption information for one of the sites of the enterprise network from one of the site computing devices 14(1)-14(n) located at the site. The current energy consumption information can include active assets or equipment currently consuming energy and how much energy is being consumed by each asset at the site, for example, although other current energy consumption information can also be obtained.

In step 310, the energy optimization device 16 identifies an active one of the service windows for the site. In one example, the energy optimization device 16 obtains current business information (e.g. sales turnover and/or guest counts) from the site computing device 14(1) located at the site. In this example, the energy optimization device 16 determines the active service window based on a comparison of the current business information to business information obtained in step 300 and stored in the database 228 as mapped to the service windows for the site. In another example, the energy optimization device 16 determines the active service window based on a comparison of a current time of day to time periods stored in the database 228 and mapped to service windows for the site. Other methods and combinations of these methods can also be used to determine an active one of the service windows for the site.

In step 312, the energy optimization device 16 compares the current energy consumption information for the active assets obtained in step 308 to the energy consumption forecast generated in step 306 for the identified active service window for the site. The energy consumption forecast can be retrieved by the energy optimization device 16 from a mapping of energy consumption forecasts to service windows for the site as stored in the database 228, for example. The comparison can be an asset level comparison and/or an overall site level comparison, for example.

In step 314, the energy optimization device 16 determines whether the current energy consumption information deviates from the forecasted energy consumption for the identified active service window by more than an established threshold. The threshold can be set by an administrator using one of the client devices 12(1)-12(n) and stored by the energy optimization device 16 in the memory 22, for example. If the energy optimization device 16 determines that the current energy consumption information does not deviate from the forecasted energy consumption for the identified active service window by more than the established threshold, then the No branch is taken to step 308 and current energy consumption information is obtained for a different one of the sites in the enterprise network.

If the energy optimization device 16 determines that the current energy consumption information deviates from the forecasted energy consumption for the identified active service window by more than the established threshold, then the Yes branch is taken to step 316. In step 316, the energy optimization device 16 determines optimization recommendation(s) for the site in order to lower the energy consumption of the site to be relatively aligned with the forecasted energy consumption for the site. The optimization recommendations can include replacing an asset, reducing idle time of an asset, operating an asset based on an relatively appropriate or preferred mode, and/or maintaining or repairing an asset, for example, although any other optimization recommendations can also be determined.

In one example, the energy optimization device 16 compares, in step 312, the current energy consumption for a vat fryer at the site to the forecasted energy consumption for that asset. In this example, the energy optimization device 16 determines that the current energy consumption for the vat fryer is 30% higher than the forecast energy consumption for that asset, which is greater than the established threshold. The forecasted energy consumption can be based on an energy consumption rating or specification for the vat fryer obtained in step 300, for example. In this example, the energy consumption device 16 determines an optimization recommendation indicating that the vat fryer needs repair to mitigate the excessive consumption of energy by that asset. Any other comparisons, thresholds, and optimization recommendations can also be utilized by the energy optimization device 16.

In step 318, the energy optimization device 16 optionally calculates operational savings for the site based on the optimization recommendations determined in step 316. In order to calculate the operational savings, the energy optimization device 16 can determine the amount of energy reduction resulting from taking the corrective actions associated with the optimization recommendations. Optionally, the amount of energy reduction can be determined based on asset states, events, ratings, site product mix, sales volume, weather conditions, occupancy, day type, site type, and/or asset age, service data, and/or efficiency.

The energy optimization device 16 can then utilize energy cost information obtained in step 300 and stored in the database 228 for the site to quantify the operational savings. Optionally, the energy optimization device 16 can calculate operational savings for each asset associated with an optimization recommendation for the site and based on each of the service windows determined in step 304 for the site. Also optionally, the operational savings calculated in step 318 can be stored by the energy optimization device 16 in the database 228.

In step 320, the energy optimization device 16 optionally prioritizes the optimization recommendations for the site. The prioritization can be based on ease of implementation, amount of operational savings, and/or business impact, for example, although other factors can also be used to prioritize optimization recommendations determines in step 316.

In step 322, the energy optimization device 16 outputs the optimization recommendations determined in step 316, optionally along with the calculated operational savings and in a prioritized order. Also optionally, the energy optimization device 16 can generate report(s) for the site, such as an energy consumption trend report, a site energy consumption report, an asset comparison report, a site comparison report, a deviation report, or a forecasted energy consumption report, for example.

Figure 4:
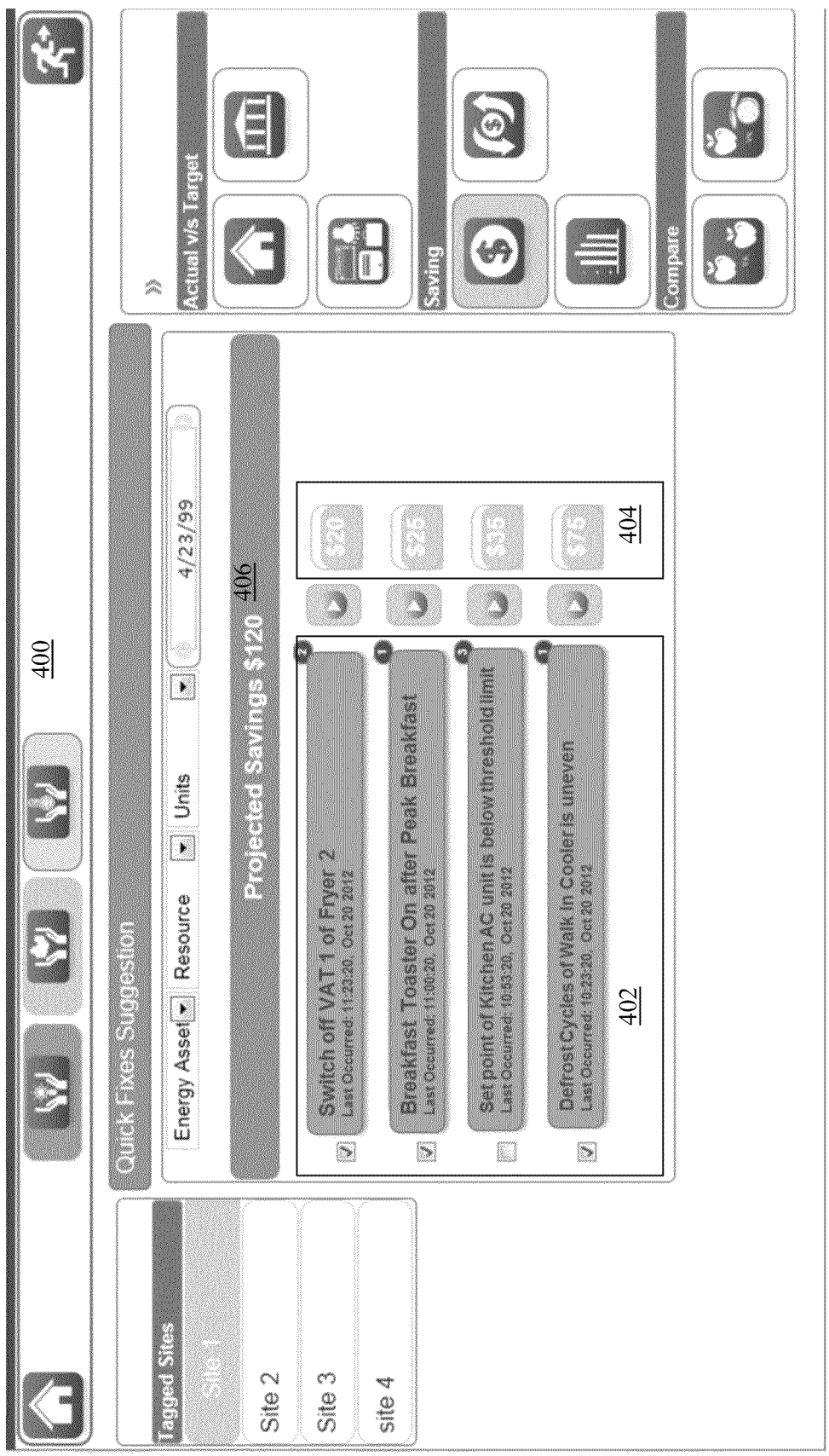
FIG. 4 is an exemplary dashboard interface for providing optimization recommendations, reports, and other energy consumption information to end users.

Referring to FIG. 4, an exemplary dashboard interface 400 for providing the determined optimization recommendations, reports, and other energy consumption information to end users is shown. Optionally, the dashboard interface 400 is generated by the energy optimization device 16 and stored in the memory 22. The energy optimization device 16 can provide the dashboard interface 400 upon receiving a request for the dashboard interface 400 from a user of one of the client devices 12(1)-12(n), for example.

In this example, the dashboard interface 400 includes an indication of optimization recommendations 402 determined by the energy optimization device 16 in step 316 for Site 1 of the enterprise network, which includes Sites 1-4. The dashboard interface 400 also includes the operational savings 404 for each of the optimization recommendations calculated by the energy optimization device 16 in step 318. Additionally, the dashboard interface 400 includes an indication of the overall projected savings 406 for the site based on implementation of selected ones of the optimization recommendations.

In other examples, the energy optimization device 16 can further generate dashboard interface(s) configured to provide graphs of historical, current, or forecasted energy consumption for one or more sites of an enterprise network as well as links to one or more reports associated with the sites of the network. Any other dashboard interfaces including any other information can also be provided. Additionally, the energy optimization device 16 can use other methods to output the optimization recommendations in step 322

Optionally, the energy optimization device 16 can repeat steps 308-322 for another site in an enterprise network. In some examples, any of steps 308-322 can be performed periodically and in parallel for any number of sites in a network.

By this technology, an enterprise having a network of sites can plan, manage, monitor, and optimize energy utilization at the sites more effectively and based on service windows associated with the sites. With this technology, site infrastructure and assets can be monitored and optimization recommendations can be generated based on an active service window and forecasted energy consumption for the various service windows associated with the sites. If implemented, the optimization recommendations can reduce energy consumption at the sites, resulting in reduced cost for the enterprise. Dashboard interfaces and/or reports can also be provided to users to facilitate visualization of the energy consumption at the sites, as well as any determined optimization recommendations and projected savings.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in

The claims. Accordingly, the invention is limited only by the following claims and equivalents thereto.

What is claimed is:

1. A method for analyzing energy consumption by physical infrastructure located in a network of geographically separated sites associated with a service-window-based enterprise in order to optimize utilization, the method comprising:

generating, by an energy optimization device, an energy model for each of a plurality of sites in an enterprise network;

determining, by the energy optimization device, a plurality of service windows within an established time period for each of the plurality of sites based on one or more threshold deviations identified in historical business data or historical energy consumption data;

dynamically generating, by the energy optimization device, an energy consumption forecast for each of the determined service windows for each of the plurality of sites based on the generated energy models and obtained real-time operations data, and storing a mapping of the energy consumption forecasts to the determined service windows for each of the plurality of sites;

obtaining, by the energy optimization device, current energy consumption data for one of the plurality of sites from one or more site computing devices located at each of the plurality of sites and via one or more communication networks;

determining, by the energy optimization device, and outputting via a graphical dashboard interface, one or more optimization recommendations for the one of the plurality of sites based on a deviation of the obtained current energy consumption data for the one of the plurality of sites from the generated energy consumption forecast mapped to one or more active ones of the determined service windows for the one of the plurality of sites; and repeating, by the energy optimization device, the obtaining, determining optimization recommendations, and outputting for one or more other of the plurality of sites.

2. The method of claim 1, further comprising:

obtaining, by the energy optimization device, the historical business data for each of the plurality of sites, the historical business data comprising service type, size, layout, orientation, time of operation, geographic location, sales or production trend, variations in business operations, sales turnover, seasonality, or weather;

obtaining, by the energy optimization device, the historical energy consumption data for each of the plurality of sites, the historical energy consumption data comprising energy asset data including make, model, specification, functional profile, age, technology, type of consumption, or energy source data including schedule, availability, or cost for each of the plurality of sites; and obtaining, with the energy optimization device, infrastructure data for each of the plurality of sites, the infrastructure data comprising energy policies or practices.

3. The method of claim 2, wherein the determining the plurality of service windows further comprises identifying a plurality of time windows of a time period for each of the plurality of sites during which the historical business data or historical energy consumption data for each of the plurality of sites deviates by an established threshold from the historical business data or historical energy consumption data for each of the plurality of sites of other time windows of the time period for each of the plurality of sites.

4. The method of claim 2, wherein the generating the energy model for each of the plurality of sites further comprises:

generating, by the energy optimization device, a business model for each of the plurality of sites based at least on the historical business data;

generating, by the energy optimization device, an energy consumption model for each of the plurality of sites based at least on the historical energy consumption data; and generating, by the energy optimization device, an energy infrastructure model for each of the plurality of sites based at least on the infrastructure data.

5. The method of claim 4, further comprising generating and storing, with the energy optimization device, one or more mappings for one or more of the plurality of sites based on one or more of the business, energy consumption, or energy infrastructure models, or the plurality of service windows for the one or more of the plurality of sites.

6. The method of claim 1 wherein the determining one or more optimization recommendations further comprises:

identifying the active one of the service windows for the one of the plurality of sites;

obtaining energy consumption data for active assets currently consuming energy for the one of the plurality of sites; and comparing the energy consumption data for the active assets to the energy consumption forecast for the identified active service window for the one of the plurality of sites.

7. The method of claim 1 wherein the one or more optimization recommendations are selected from replacing one or more assets, reducing idle time of one or more assets, operating one or more assets based on an appropriate or preferred mode, or maintaining or repairing one or more assets.

8. The method of claim 1 wherein the outputting the optimization recommendations further comprises:

calculating operational savings for one or more of the determined service windows for the one of the plurality of sites;

prioritizing the optimization recommendations for the one of the plurality of sites;

generating one or more reports for one or more of the plurality of sites selected from an energy consumption trend report, site energy consumption report, asset comparison report, site comparison report, deviation report, or forecasted energy consumption report; and generating one or more dashboard interfaces for providing the reports or data included in the reports to a user upon request.

9. A non-transitory computer readable medium having stored thereon instructions for analyzing energy consumption by physical infrastructure located in a network of geographically separated sites associated with a service-window-based enterprise in order to optimize utilization comprising machine executable code which when executed by a processor, causes the processor to perform steps comprising:

generating an energy model for each of a plurality of sites in an enterprise network;

determining a plurality of service windows within an established time period for each of the plurality of sites based on one or more threshold deviations identified in historical business data or historical energy consumption data;

dynamically generating an energy consumption forecast for each of the determined service windows for each of the plurality of sites based on the generated energy models and obtained real-time operations data, and storing a mapping of the energy consumption forecasts to the determined service windows for each of the plurality of sites;

obtaining current energy consumption data for one of the plurality of sites from one or more site computing devices located at each of the plurality of sites and via one or more communication networks;

determining and outputting via a graphical dashboard interface, one or more optimization recommendations for the one of the plurality of sites based on a deviation of the obtained current energy consumption data for the one of the plurality of sites from the generated energy consumption forecast mapped to one or more active ones of the determined service windows for the one of the plurality of sites; and repeating the obtaining, determining optimization recommendations, and outputting for one or more other of the plurality of sites.

10. The medium of claim 9 further comprising machine executable code which, when executed by the processor, causes the processor to perform steps further comprising:

obtaining the historical business data for each of the plurality of sites, the historical business data comprising service type, size, layout, orientation, time of operation, geographic location, sales or production trend, variations in business operations, sales turnover, seasonality, or weather;

obtaining the historical energy consumption data for each of the plurality of sites, the historical energy consumption data comprising energy asset data including make, model, specification, functional profile, age, technology, type of consumption, or energy source data including schedule, availability, or cost for each of the plurality of sites; and obtaining infrastructure data for each of the plurality of sites, the infrastructure data comprising energy policies or practices.

11. The medium of claim 10 wherein the determining the plurality of service windows further comprises identifying a plurality of time windows of a time period for each of the plurality of sites during which the historical business data or historical energy consumption data for each of the plurality of sites deviates by an established threshold from the historical business data or historical energy consumption data for each of the plurality of sites of other time windows of the time period for each of the plurality of sites.

12. The medium of claim 10 wherein the generating the energy model for each of the plurality of sites further comprises:

generating a business model for each of the plurality of sites based at least on the historical business data;

generating an energy consumption model for each of the plurality of sites based at least on the historical energy consumption data; and generating an energy infrastructure model for each of the plurality of sites based at least on the infrastructure data.

13. The medium of claim 12 further comprising machine executable code which, when executed by the processor, causes the processor to perform steps further comprising generating and storing one or more mappings for one or more of the plurality of sites based on one or more of the business, energy consumption, or energy infrastructure models, or the plurality of service windows for the one or more of the plurality of sites.

14. The medium of claim 9 wherein the determining one or more optimization recommendations further comprises:

identifying the active one of the service windows for the one of the plurality of sites;

obtaining energy consumption data for active assets currently consuming energy for the one of the plurality of sites; and comparing the energy consumption data for the active assets to the energy consumption forecast for the identified active service window for the one of the plurality of sites.

15. The medium of claim 9 wherein the one or more optimization recommendations are selected from replacing one or more assets, reducing idle time of one or more assets, operating one or more assets based on an appropriate or preferred mode, or maintaining or repairing one or more assets.

16. The medium of claim 9 wherein the outputting the optimization recommendations further comprises:

calculating operational savings for one or more of the determined service windows for the one of the plurality of sites;

prioritizing the optimization recommendations for the one of the plurality of sites;

generating one or more reports for one or more of the plurality of sites selected from an energy consumption trend report, site energy consumption report, asset comparison report, site comparison report, deviation report, or forecasted energy consumption report; and generating one or more dashboard interfaces for providing the reports or data included in the reports to a user upon request.

17. An energy optimization device, comprising:

a memory; and a processor coupled to the memory and configured to execute programmed instructions stored in the memory, comprising:

generating an energy model for each of a plurality of sites in an enterprise network;

determining a plurality of service windows within an established time period for each of the plurality of sites based on one or more threshold deviations identified in historical business data or historical energy consumption data;

dynamically generating an energy consumption forecast for each of the determined service windows for each of the plurality of sites based on the generated energy models and obtained real-time operations data, and storing a mapping of the energy consumption forecasts to the determined service windows for each of the plurality of sites;

obtaining current energy consumption data for one of the plurality of sites from one or more site computing devices located at each of the plurality of sites and via one or more communication networks;

determining and outputting via a graphical dashboard interface, one or more optimization recommendations for the one of the plurality of sites based on a deviation of the obtained current energy consumption data for the one of the plurality of sites from the generated energy consumption forecast mapped to one or more active ones of the determined service windows for the one of the plurality of sites; and repeating the obtaining, determining optimization recommendations, and outputting for one or more other of the plurality of sites.

18. The device of claim 17 wherein the processor is further configured to execute programmed instructions stored in the memory further comprising:

obtaining the historical business data for each of the plurality of sites, the historical business data comprising service type, size, layout, orientation, time of operation, geographic location, sales or production trend, variations in business operations, sales turnover, seasonality, or weather; and obtaining the historical energy consumption data for each of the plurality of sites, the historical energy consumption data comprising energy asset data including make, model, specification, functional profile, age, technology, type of consumption, or energy source data including schedule, availability, or cost for each of the plurality of sites; and obtaining infrastructure data for each of the plurality of sites, the infrastructure data comprising energy policies or practices.

19. The device of claim 18 wherein the determining the plurality of service windows further comprises identifying a plurality of time windows of a time period for each of the plurality of sites during which the historical business data or historical energy consumption data for each of the plurality of sites deviates by an established threshold from the historical business data or historical energy consumption data for each of the plurality of sites of other time windows of the time period for each of the plurality of sites.

20. The device of claim 18 wherein the generating the energy model for each of the plurality of sites further comprises:
generating a business model for each of the plurality of sites based at least on the historical business data;
generating an energy consumption model for each of the plurality of sites based at least on the historical energy consumption data; and
generating an energy infrastructure model for each of the plurality of sites based at least on the infrastructure data.

21. The device of claim 20 wherein the processor is further configured to execute programmed instructions stored in the memory further comprising generating and storing one or more mappings for one or more of the plurality of sites based on one or more of the business, energy consumption, or energy infrastructure models, or the plurality of service windows for the one or more of the plurality of sites.

22. The device of claim 17 wherein the determining one or more optimization recommendations further comprises:
identifying the active one of the service windows for the one of the plurality of sites;
obtaining energy consumption data for active assets currently consuming energy for the one of the plurality of sites; and
comparing the energy consumption data for the active assets to the energy consumption forecast for the identified active service window for the one of the plurality of sites.

23. The device of claim 17 wherein the one or more optimization recommendations are selected from replacing one or more assets, reducing idle time of one or more assets, operating one or more assets based on an appropriate or preferred mode, or maintaining or repairing one or more assets.

24. The device of claim 17 wherein the outputting the optimization recommendations further comprises:
calculating operational savings for one or more of the determined service windows for the one of the plurality of sites;
prioritizing the optimization recommendations for the one of the plurality of sites;
generating one or more reports for one or more of the plurality of sites selected from an energy consumption trend report, site energy consumption report, asset comparison report, site comparison report, deviation report, or forecasted energy consumption report; and
generating one or more dashboard interfaces for providing the reports or data included in the reports to a user upon request.

* * * * *